Nov. 20, 1962   A. W. SERIO   3,065,018
DETACHABLE HANDLE APPARATUS
Filed Sept. 27, 1960
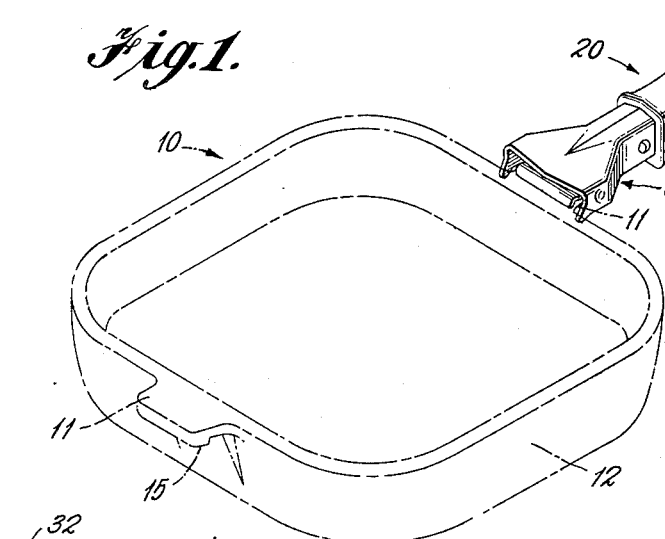
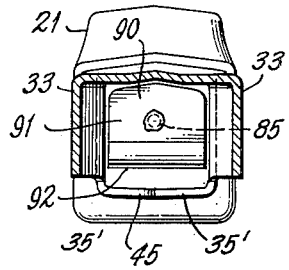
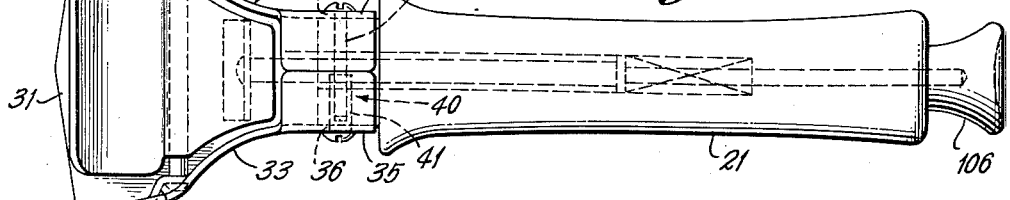
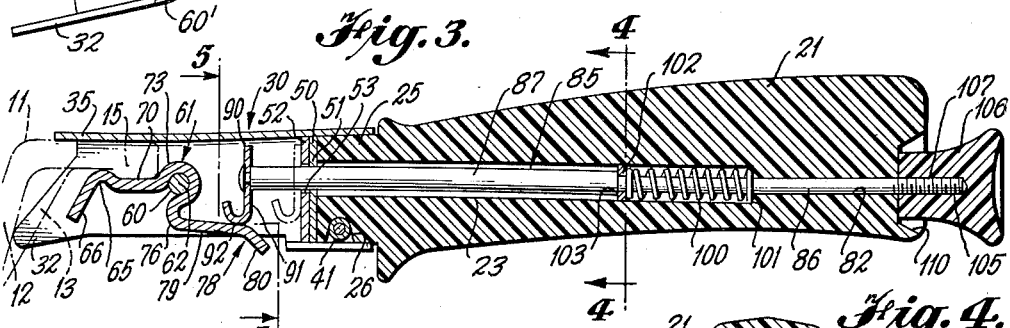
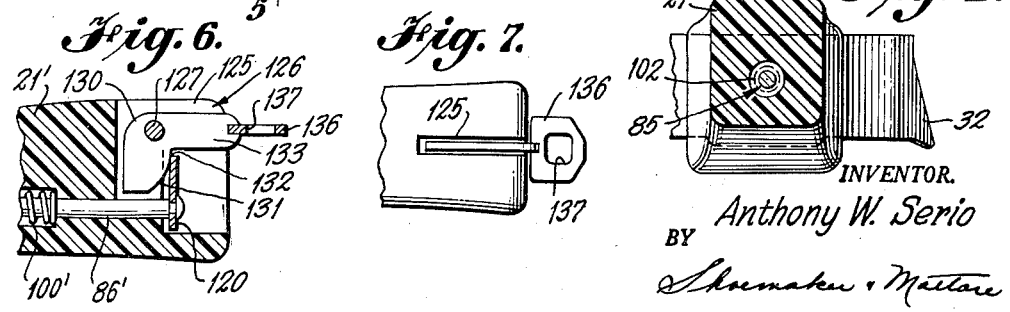
INVENTOR.
Anthony W. Serio
BY
Shumaker + Mattare
ATTORNEYS Patented Nov. 20, 1962

3,065,018
DETACHABLE HANDLE APPARATUS
Anthony W. Serio, 1704 Caton Ave., Elmira, N.Y.
Filed Sept. 27, 1960, Ser. No. 58,687
4 Claims. (Cl. 294—31)

The present invention relates to a new and novel detachable handle apparatus, and more particularly to a detachable handle apparatus which is adapted to be quickly and easily attached to articles such as casserole dishes and the like. The present invention represents an improvement over my copending application Serial No. 782,750.

When using casserole dishes or the like, the dish often becomes very hot as a result of cooking foods in an oven or the like and it is desirable to provide means for lifting the dish from place to place without the necessity of handling it with bulky, heat insulating pads and the like. It is accordingly a primary object of the present invention to provide a detachable handle which can be quickly and easily attached to and removed from such a dish for lifting and handling the dish without the necessity of actually touching the dish and further providing a heat insulating means which prevents discomfort to the hands of the user.

It is additionally important to provide a detachable handle mechanism which when mounted in position on a dish presents a neat and pleasant appearance, and which provides a construction which is relatively compact and light in weight. The above objectives are accomplished in the present invention by providing a detachable handle apparatus which cooperates with a casserole dish or the like having integral extensions formed thereon and provided with a lip with which the handle apparatus is adapted to cooperate.

The clamping assembly of the present invention which actually grips and clamps a portion of a casserole dish so as to operatively connect the handle apparatus to the dish is substantially identical to that disclosed in my aforementioned copending application. This clamping assembly is supported at one outer end portion of a hand grip member which is adapted to be held in the hand of a person utilizing the apparatus.

The manner of operating the clamping assembly of the present invention is substantially different from that disclosed in my aforementioned copending application, and represents an improvement thereover since the operating mechanism of the present invention is of a more positive nature and is more simply accomplished.

In the present invention, a pivotally mounted clamping element is provided with a locking end portion which slopes rearwardly toward the hand grip member and downwardly thereof. A locking member is provided for engaging the locking end portion of the clamping element and for holding the clamping element in locked clamped position. The locking member includes a depending portion having an arcuate lower edge adapted to engage and slide along the upper surface of the locking end portion of the clamping element.

The locking member is fixed to the outer end of an actuating rod which is slidably disposed within a longitudinal bore formed in the hand grip member. Resilient means, preferably in the form of a compression spring, is operatively connected with the actuating rod for normally urging the actuating rod toward the clamping element such that the locking member rides up along the upper surface of the locking end portion of the clamping element to thereby urge the clamping element into clamping position. In this manner, the resilient means normally maintains the locking member in such position as to retain the clamping element in a tightly locked clamped position. This coaction positively prevents release of the clamping element until the actuating rod is positively moved manually by a person away from the locked position which is normally maintained by the resilient means.

Release means is provided at the opposite end portion of the actuating rod from the locking member, and according to the present invention, this release means may take two forms. In the first form, a manually engageable pull knob is attached to the rear end portion of the actuating rod, and the clamping mechanism is released by simply pulling the actuating rod against the force of the resilient means so as to permit the clamping element to pivot out of locking position. When the pull knob is allowed to return to its normal position under the influence of the resilient means, the locking member will again urge the clamping element into its clamping position.

In the second form of the invention, the release means includes a member secured to the rearward end portion of the actuating rod, and an operating cam member is pivotally supported by the hand grip member. This operating cam member includes a cam surface which engages the member secured to the rear end of the actuating rod whereby upon pivotal movement of the cam operating member, a rearward force will be created on the member attached to the actuating rod thereby moving the actuating rod rearwardly to release the clamping mechanism.

An object of the present invention is to provide a new and novel detachable handle apparatus which is particularly adapted for use with casserole dishes and the like.

Another object is the provision of a detachable handle apparatus which is very attractive in appearance, and which can be quickly and easily attached to or removed from a dish or the like by imparting a reciprocatory motion to the actuating rod of the apparatus.

A further object of the invention is to provide a detachable handle apparatus incorporating an arrangement which positively prevents release of the clamping mechanism under load to ensure that the handle apparatus will not become accidentally released from an associated dish and the like.

A still further object of the invention is to provide a detachable handle apparatus which is quite simple, compact and inexpensive in construction and yet which is sturdy and reliable in operation.

Other objects and many attendant advantages of the present invention will become more apparent when considered in connection with the specification and accompanying drawing, wherein:

FIG. 1 is a perspective view illustrating one form of the detachable handle apparatus of the present invention as utilized with a casserole dish indicated in phantom lines for the sake of clarity;

FIG. 2 is a bottom view of a first form of the invention;

FIG. 3 is a longitudinal section of the device shown in FIG. 2;

FIG. 4 is a sectional view partly broken away along line 4—4 of FIG. 3 looking in the direction of the arrows;

FIG. 5 is a sectional view taken substantially along line 5—5 of FIG. 3 looking in the direction of the arrows;

FIG. 6 is a longitudinal section illustrating the rear end portion of a modified form of the invention; and FIG. 7 is a top view of the modification shown in FIG. 6.

Referring now to the drawings wherein like reference characters designate corresponding parts throughout the several views, there is shown in FIG. 1 a casserole dish or the like shown in phantom lines and indicated generally by reference numeral 10. The dish 10 is provided with a pair of integral extensions 11 at the opposite sides thereof, these integral extensions being more clearly visible in FIG. 3, the dish also being provided with a downwardly sloping outer wall 12. A portion 13 of the side wall 12 is of greater thickness to provide a reinforced portion immediately under each of the integral extensions 11. As seen particularly in FIG. 3, each of the integral extensions 11 is provided with a depending lip 15 for a purpose hereinafter described.

The detachable handle apparatus according to the present invention is indicated generally by reference numeral 20, and includes a hand grip member 21 formed of heat-resistant synthetic material such as "Bakelite" or the like. The hand grip member is provided with a longitudinal bore therethrough, a first portion of the bore being indicated by reference numeral 22 and a second enlarged portion of the bore being indicated by reference numeral 23. The end portion 25 of the hand grip member is of reduced size and is provided with a substantially U-shaped channel 26 formed in the undersurface thereof.

A clamping assembly is supported upon the reduced end portion 25 of the hand grip member and includes an integral body 30 formed of metal or the like. The body 30 includes a central foot-like portion 31, the lower surface of which is adapted to engage the upper surface of the extension on a dish or the like, the body 30 also including a pair of downwardly and outwardly flaring leg portions 32 as seen most clearly in FIGS. 2 and 3. These leg portions 32 are adapted to straddle the extension formed on the supported article and engage the side wall of the dish as seen for example in FIG. 3.

The rear portion of body 30 includes inwardly tapering side walls 33, as seen in FIG. 2, which narrow to a neck portion 34, the side walls 35 of the neck portion being provided with aligned openings 36 which are adapted to be aligned with the channel 26 in portion 25 of the hand grip member. An attaching means indicated generally by reference numeral 40 includes a hollow cylindrical member 41 having threads formed on the inner bore thereof, and a screw member 42 which is threadedly received within member 41. It is apparent that attaching means 40 serves to secure the clamping assembly to the hand grip member and positively prevents separation thereof. The side walls 35 of the clamping assembly are disposed closely adjacent the side walls of portion 25 of the hand grip member, and the lower portions of side walls 35 are turned inwardly at 35' as seen most clearly in FIG. 5 and are adapted to engage the under surface 45 of end portion 25 of the hand grip member for more securely securing the clamping assembly in operative position.

As seen particularly in FIG. 3, a first shield member 50 is supported within the neck portion 30 of the clamping assembly and is provided with a configuration complementary to the inner surface of the neck portion. Shield member 50 is formed of a heat-insulating material such as asbestos and is provided with a central opening 51 therethrough which is aligned with the bore portion 23 of the hand grip member 21.

A second shield member 52 of similar configuration to shield member 50 is provided, member 52 being formed of a suitable metal such as stainless steel or the like and having a central opening 53 formed therethrough and substantially aligned with the opening 51 formed in shield member 50.

A pivot pin 60 is supported within portions 60' formed at opposite sides of the body 30, and a clamping element indicated generally by reference numeral 61 is supported upon pivot pin 60, the pivot pin having a pivot axis represented by reference numeral 62. As seen most clearly in FIG. 3, clamping element 61 comprises an integral member formed of resilient material such as spring steel or the like and is provided with a support end portion 65 adapted to engage the under surface of extension 11 of the dish or the like. The end 66 of the clamping element extends in a downward direction.

Closely adjacent support end portion 65 the clamping element defines a trough-like portion indicated by reference numeral 70, this trough-like portion receiving the lip 15 formed in the dish extension. The intermediate portion 75 of the clamping element is of substantially horseshoe-shaped configuration and is wrapped partially around pivot pin 60 such that the clamping element is free to pivot about pin 60 and can not be removed therefrom when the device is in assembled position as shown. The clamping element is reversely turned at 76 and extends rearwardly toward the hand grip member 21. The rearward portion 78 of the clamping element may be considered to be a locking end portion. It will be noted that the locking end portion comprises a first portion 79 which extends rearwardly and downwardly and merges with a second portion 80 which extends further rearwardly and slopes downwardly to a greater degree than the portion 79. Accordingly, the upper surfaces of the portions 79 and 80 of the locking end portion 78 extend rearwardly and downwardly with respect to the apparatus.

An actuating rod indicated generally be reference numeral 85 includes a first portion 86 which is slidably received within the bore portion 22 and a second enlarged portion 87 which is spaced from the surrounding wall of the bore portion 23. Portion 87 of the actuating rod also slidably extends through openings 51 and 53 provided in shield members 50 and 52 respectively, the walls of these openings assisting in supporting the forward end portion of the actuating rod. It is apparent that the actuating rod 85 is freely reciprocably mounted within the bore extending through the hand grip member 21.

A locking member 90 is secured to the outer end of actuating rod 85 in a suitable manner, the locking member 90 including a depending portion 91 having a lower arcuate surface 92 which is adapted to engage the upper surface of the portions 79 and 80 of the clamping element 61.

It will be apparent that in the position shown in FIG. 3, where in the locking member 90 has been moved to its limit of movement in a lefthand direction toward the clamping element, the clamping element has been pivoted clockwise about the pivot axis 62 of the pivot pin 60 so as to move the clamping element into clamping position to tightly clamp the end extension of the associated dish to the clamping assembly.

In this position, the dish will be positively locked to the handle apparatus, and the clamping element cannot accidentally release.

The means which ensures that there can not be any accidental release of the locking member is in the form of a resilient means which normally urges the locking member into the locked position as shown in FIG. 3. This resilient means according to the present invention may assume the form of a compression spring 100, one end of which engages against shoulder 101 defined between the two bore portions 22 and 23 of the hand grip member. The opposite end of spring 100 engages against a washer 102 which in turn bears up against a shoulder 103 defined between the two portions 86 and 87 of the actuating rod 85.

It is evident that the compression spring 100 normally urges the actuating rod to the left as seen in FIG. 3 thereby causing the lower arcuate portion 92 of the locking member 90 to first ride along the upper surface of portion 80 of the clamping element and thence along the upper surface of portion 79 of the clamping element to pivot the clamping element into locking position. It should be understood that the construction of the clamping element is such that when the apparatus is held in the position shown in FIG. 3, the clamping element normally tends to pivot in a counterclockwise direction under the influence of gravity.

Means is providved at the opposite or rearward end portion of the actuating rod for moving the rod against the force of the resilient spring 100. As seen in FIG. 3, the rear end portion 105 of the actuating rod is threaded, and a pull knob 106 is provided with an outer configuration such that it is readily grasped in the fingers of a person's hand. A threaded bore 107 is provided at the forward end of the pull knob 106 and the pull knob is threaded upon the rear end portion of the actuating rod. A recessed portion 110 is provided at the rear end of the hand grip member 21 for receiving the forward portion of the pull knob 106.

It is apparent that in order to release the clamping element as seen in FIG. 3, it is merely necessary to pull rearwardly or to the right as seen in FIG. 3 on the pull knob so as to move the actuating rod to the right. This action will move the locking member 90 into the dotted line position shown in FIG. 3 whereupon the clamping element can pivot in a counterclockwise direction so as to release the extension on the associated supported article. When it is again desired to clamp the handle apparatus in operative position, it is merely necessary to insert the extension on the dish or the like between the clamping portion of the clamping element and the portion 31 of the body 30 and then release the pull knob 106 to allow the compression spring 100 to urge the locking member into locking position.

A modified form of release means is shown in FIGS. 6 and 7 wherein parts similar to those previously described are provided with the same reference numerals primed. In this modification, a member 120 which may comprise a small plate or the like is secured to the rear end portion of the actuating rod by suitable means. The rear portion of the grip member in this case is provided with a slot 125.

An operating cam member indicated by reference numeral 126 is disposed within slot 125 and is pivotally connected to the hand grip member by a pivot pin 127. Operating cam member 126 includes a first leg portion 130, leg portion 130 having an arcuate cam surface 131 formed thereon, surface 131 engaging the upper forward edge 132 of the member 120 fixed to the actuating rod.

Operating cam member 126 also includes a second leg portion 135 having an extension 136 attached thereto and extending substantially normally to the remaining portion of the operating cam member. Extension 136 is provided with a central opening 137 which may be employed for hanging the handle apparatus upon a suitable hook or the like.

It will be evident that in this modification, the compressing spring 100' will urge the actuating rod forwardly into locking position. When it is desired to release the locking mechanism for attaching the handle apparatus to or removing it from an associated container, the extension 136 can be grasped and simply moved upwardly and forwardly thereby pivoting the operating cam member 126 in a counterclockwise direction. This will cause the cam surface 131 on leg portion 130 to move the member 120 and attached actuating rod to the right or rearwardly so as to release the clamping mechanism. When the extension 136 is released, the clamping mechanism will be automatically returned to its clamping position by resilient means 100'.

It is apparent from the foregoing that there is provided a new and novel detachable handle apparatus which is particularly adapted for use with casserole dishes and the like. The handle apparatus has a very attractive appearance and can be quickly and easily attached to or removed from a dish or the like by a simple pushing or pulling motion. Means is provided for positively preventing release of the clamping mechanism such that the handle will not be accidentally released from an associated container while in use. The apparatus is quite simple, compact and inexpensive in construction, and yet is sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A detachable handle for cooking sauce pans and like vessels comprising an elongate handle body, a locking mechanism supported by said handle body and including a locking cam and a clamping element for clamping an article between said clamping element and a portion of said handle body, a pivot pin supported by said handle body, said clamping element comprising an integral elongate member including a forward support end portion for engaging a supported article, an intermediate portion and a rear end locking portion for engaging said locking cam, the said intermediate portion of said clamping element including a part curving over and in snug engagement with more than half the circumference of said pivot pin for pivotally supporting the clamping element on said pivot pin and said pivot pin encircling part being adapted to firmly grip the pivot pin upon an increased application of force upon said support end portion, an elongated actuating means for actuating said locking cam against said rear end locking portion to effect a clamping engagement of said support end portion with a portion of the vessel interposed between the support end portion and a part of the handle body, resilient means normally urging said actuating means in one direction so as to lock the clamping element in clamped position, and means adapted for moving said actuating means against the force of said resilient means for releasing said clamping element.

2. A detachable handle for cooking sauce pans and like vessel comprising an elongate handle body, a locking mechanism supported by said handle body and including a locking cam and a clamping element for clamping an article between said clamping element and a portion of said handle body, a pivot pin supported by said handle body, said clamping element comprising an integral elongate member including a forward support end portion for engaging a supported article, an intermediate portion and a rear end locking portion for engaging said locking cam, the said intermediate portion of said clamping element including a part curving over and in snug engagement with more than half the circumference of said pivot pin for pivotally supporting the clamping element on said pivot pin and said pivot pin encircling part being adapted to firmly grip the pivot pin upon an increased application of force upon said support end portion, an elongated actuating means for actuating said locking cam against said rear end locking portion to effect a clamping engagement of said support end portion with a portion of the vessel interposed between the support end portion and a part of the handle body, the rear end locking portion of said clamping element including a downwardly sloping surface, said elongated actuating means comprising an actuating rod slidably supported by said body means and being connected at one end thereof to said locking cam, resilient means operatively connected with said actuating rod for urging the actuating rod toward the clamping element so as to lock the clamping element in clamping position, and release means at the opposite end portion of said actuating rod adapted for moving the actuating rod against the force of said resilient means for releasing said clamping element.

3. Apparatus as defined in claim 2, wherein said release means comprises a pull knob connected to said opposite end portion of the actuating rod and being adapted to be manually grasped for pulling the actuating rod away from said clamping element.

4. Apparatus as defined in claim 2, wherein said release means comprises a member fixed to said opposite end portion of the actuating rod, and an operating cam member pivotally supported by said body means, said operating cam member including a cam surface adapted to engage said last-mentioned member for moving the actuating rod away from the clamping element.

References Cited in the file of this patent

UNITED STATES PATENTS

| | | |
|---|---|---|
| 324,671 | Drake | Aug. 18, 1885 |
| 938,187 | Walker | Oct. 26, 1909 |
| 1,268,089 | Borsse | June 4, 1918 |
| 1,406,826 | Dugger | Feb. 14, 1922 |
| 2,478,784 | Serio | Aug. 9, 1949 |
| 2,494,159 | Bernstein | Jan. 10, 1950 |
| 2,712,151 | Becht | July 5, 1955 |
| 2,851,299 | Serio | Sept. 9, 1958 |

FOREIGN PATENTS

| | | |
|---|---|---|
| 835,438 | Great Britain | May 18, 1960 |